United States Patent [19]

Weaver

[11] 3,781,652

[45] Dec. 25, 1973

[54] APPARATUS FOR ADAPTIVELY CHECKING DOCUMENT THICKNESS

[75] Inventor: George B. Weaver, Fridley, Minn.

[73] Assignee: Honeywell Information Systems Inc., Waltham, Middlesex County, Mass.

[22] Filed: Dec. 20, 1971

[21] Appl. No.: 209,857

[52] U.S. Cl. .................... 328/1, 307/235, 328/115, 328/150

[51] Int. Cl. .................................... G01n 27/00

[58] Field of Search .................. 328/150, 115, 117, 328/1; 250/119 TH; 340/169; 307/235; 343/7 A

[56] References Cited

UNITED STATES PATENTS

| | | | |
|---|---|---|---|
| 3,701,029 | 10/1972 | Hogg | 328/117 X |
| 3,582,974 | 6/1971 | Favin | 328/150 X |
| 2,543,570 | 2/1951 | Eder | 328/1 X |
| 3,185,024 | 5/1965 | McCreanor | 250/219 TH |

*Primary Examiner*—John W. Huckert
*Assistant Examiner*—B. P. Davis
*Attorney*—John S. Solakian et al.

[57] ABSTRACT

An apparatus for adaptively checking document thickness is provided, the apparatus having a transducer which senses a variation in the thickness of a document passing through a paper transport. Each new document thickness as indicated by the transducer is compared with a window established by the preceding document thickness. If the thickness of the current document meets prescribed limits as established by the preceding document, a memory element is updated to correspond to the thickness of the current document. Should the document thickness compare unfavorably with the window, an alarm signal is generated and the process halted without refreshing the memory element.

16 Claims, 2 Drawing Figures

APPARATUS FOR ADAPTIVELY CHECKING DOCUMENT THICKNESS

BACKGROUND OF THE INVENTION

1. Field of the Invention

This invention relates generally to detection circuitry and more specifically to an improved system for detecting and checking variations in document thickness.

2. Description of the Prior Art

Modern machines for processing documents have the facility for feeding documents varying widely in size, shape and thickness. This feature eliminates the feasibility of utilizing a fixed throat for spearating the documents and consequently increases the tendency for documents to be processed in an overlapped condition.

To date, the need for a detector mechanism to prevent the feeding of inappropriate documents has been well recognized. In past instances, a mechanical device such as a lever had been used. The lever would transmit an unknown document if it were less than a certain thickness, If this thickness were exceeded, however, the lever would render the entire system inoperable. Although the principle of this prior art device was satisfactory, the results were unsuitable since very thin documents were sometimes mutilated and overlapped documents were infrequently transmitted.

Although electrical devices required a tedious set up procedure, they have been used to overcome the above-mentioned mechanical device problem. However, the electrical systems have introduced other problems. Since a document run could last many hours, the problems of drift and leakage of electrical parameters caused faulty operation. Other problems resulted from non-uniform manufacturing tolerances for the document thickness and also unequal tolerances for different sized documents. For example, with bank checks the detecting tolerances can be narrow since check documents have excellent uniform thickness. However, vouchers and cards have poor manufacturing tolerances and hence must be allowed greater detecting tolerances. Also different sized vouchers have either better or worse manufacturing tolerances. It has been discovered that due to these variations, a good document has been rejected.

The system of the present invention overcomes these problems by providing circuitry which is adaptive in nature. As each document is processed, the information relating to it is used to set up the conditions for the subsequent document. As a result problems of drift or leakage are not encountered since the circuitry is constantly being refreshed. Moreover, ease of set up is insured since the first document inherently provides the information upon which testing of the subsequent document is predicated. The operator only has to select a desirable tolerance for the particular sized document.

OBJECTS OF THE INVENTION

It is a primary object of this invention to provide an improved document thickness checking apparatus which is highly reliable and efficient in operation and uses a minimum number of components.

It is another object of the invention to provide a novel and improved checking device which does not need to be specifically adjusted for the shape or thickness of a new group of documents, thereby greatly simplifying setup and overall operation.

It is a further object of the invention to provide checking circuitry which automatically recognizes non-uniform documents and which generates an alarm signal to indicate the same to an operator and/or an associated system.

It is another object of the invention to provide checking circuitry which overcomes the prior art problems of the leakage and drift.

SUMMARY OF THE INVENTION

These and other objects of the invention are realized by providing an apparatus for adaptively checking document thickness which apparatus comprises a first means for providing a voltage corresponding to the thickness of the current document being sensed, a second means for providing a voltage commensurate with the preceding document thickness, means for comparing the voltages produced by the first and second means, and means responsive to the means for comparing for either accepting the sensed document or activating a halt mechanism so that the document is not accepted.

BRIEF DESCRIPTION OF THE DRAWINGS

The novel features which are characteristic of this invention are set forth with particularity in the appended claims. The invention itself, however, both as to its organization and method of operation together with further objects and advantages thereof may best be understood by reference to the following description taken in connection with the accompanying drawings in which:

DETAILED DESCRIPTION OF THE INVENTION

Figure 1:
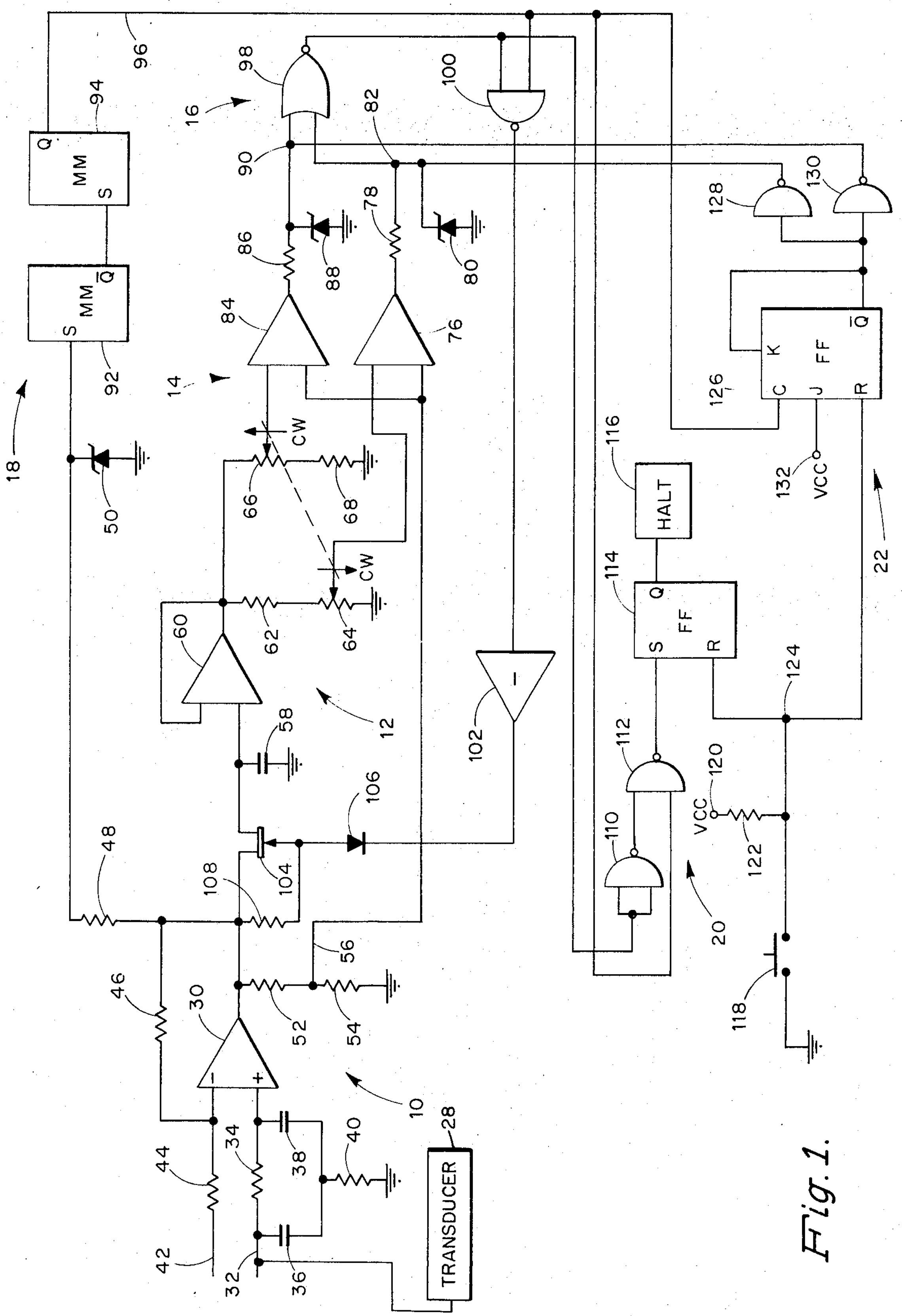
FIG. 1 is a schematic diagram illustrating a preferred embodiment of the invention.

Referring to the preferred embodiment schematically illustrated in FIG. 1, there is shown a first voltage providing means 10 which provides a voltage corresponding to the thickness of the document being sensed by means of a transducer 28 which may be connected to conductor 32. The transducer type is not limiting so long as it produces a voltage which is substantially proportional to the document thickness. A second voltage providng means 12 provides a reference voltage based on the thickness of the preceding document. Comparison circuit 14 contrasts the voltages produced by the first and second voltage providing means and provides an output to responsive circuit 16. A time delayed circuit 18 allows the voltages to settle and then provides an output to responsive circuit 16. If the sensed document is within acceptable limits, responsive circuit 16 refreshes and updates the second voltage providing means 12. If the sensed document is unacceptable, responsive circuit 16 enables control circuit 20 to disable further operation. Also included is initializing circuit 22 which controls responsive circuit 16 for an initial document.

Included within the first voltage providing means 10 is an amplifier 30 which is coupled to receive a first input over conductor 32. Conductor 32 transmits the voltage developed from the transducer 28 sensing the thickness of the unknown current document. Since the signal generated typically has noise associated therewith, a filter circuit such as that comprising resistor 34, capacitors 36 and 38 and resistor 40 is provided. A reference or bias input is transmitted over conductor 42 and provides the other input to amplifier 30 thereby biasing the output of amplifier 30. Resistors 44 and 46 provide a scaling factor which increases the gain of amplifier 30. Amplifier 30 provides an output voltage signal which triggers time delay circuit 18 via resistor 48 as clamped by zener diode 50 and additionally provides an input voltage signal to comparison means 14 via resistive chain 52, 54 and conductor 56.

The second voltage providing means 12 includes memory element 58 which may be a capacitor, amplifier 60 connected in a voltage follower configuration, and resistors 62, 64, 66 and 68. Memory element 58 provides a reference voltage which corresponds to the thickness of the preceding document as will be subsequently explained. The resistive divider comprised of resistors 62 and 64 is utilized as a first window which provides a presettable lower reference voltage to comparison means 14 via the variable contact of resistor 64 and the resistive divider comprised of resistors 66 and 68 is utilized as a second window which provides a presettable upper reference voltage to comparison means 14 via the variable contact of resistor 66. As is shown in FIG. 1, variable resistors 64 and 66 may be ganged together and controlled manually by a knob (not shown) on the data processing equipment. Once set, resistors 64 and 66 need not be changed. By providing a variable resistance setting, the upper and lower bounds for document thickness are defined. Thus, the use of variable resistors 64 and 66 provides a window which can account for particular manufacturing tolerances. For example, if documents such as punched cards, which have relatively poor manufacturing tolerances, are sensed, the variable resistors may be set closer to the extreme limits, thereby producing a maximum voltage range, and thus enabling a high variation level. On the other hand, if checks, which have minute manufacturing tolerances are sensed, the variable resistors may be set so that each resistive divider provides a minimum voltage range.

Comparison circuit 14 includes a lower limit voltage comparison circuit comprising amplifier 76, resistor 78, zener diode 80 and junction 82 and an upper limit voltage comparison circuit comprising amplifier 84, resistor 86, zener diode 88 and junction 90. Each amplifier provides an output based on a comparison of the voltage from amplifier 30 via conductor 56 to the reference voltage received via the variable contacts of resistors 64 and 66. The result of this comparison is fed via junctions 82 and 90 to responsive circuit 16, which indicates whether or not the current document is within the desired limits. Resistors 78 and 86 are provided as short circuit protection for amplifier 76 and 84, respectively, while zener diodes 80 and 88 serve to clamp the output voltages of amplifiers 76 and 84 respectively.

Time delay circuit 18 is operable simultaneously with comparison circuit 14 and provides a blanking period which allows the transducer output to settle following the sensing of the unknown current document. The time delay circuit 18 includes monostable multivibrator 92 having its input connected to the output of differential amplifier 30 and monostable multivibrator 94 having its input connected to the $\overline{Q}$ output of monostable multivibrator 92. As is well known in the art, the introduction of a triggering pulse changes the stable output state to a new state for a predetermined period and then returns to its stable state. Since a discrete group of documents is being sensed, great voltage changes are constantly occurring. Time delay circuit 18 provides a distinct period when the decision is made.

Responsive circuit 16, which includes gates 98 and 100, inverting amplifier 102 and transistor 104, reacts to the outputs provided from comparison circuit 14 and time delay circuit 18. Specifically NOR gate 98 is connected to comparison circuit 14 via junctions 82 and 90. NAND gate 100 receives the output of gate 98 and additionally receives the output from time delay circuit 16 via conductor 96. If the signals to gate 100 indicate a favorable document thickness, gate 100 enables inverter amplifier 102 which, in turn, triggers transistor 104 which is preferably of the field effect type. This allows coupling of the voltage of amplifier 30 to memory element 58 thereby refreshing element 58. If the signals to gate 100 indicate an unfavorable document thickness, gate 100 is not enabled and memory element 58 will not be refreshed. Diode 106 is provided as protection for transistor 104 while resistor 108 provides a leakage current path for the voltage stored between the anode of diode 106 and the gate of transistor 104.

When gate 100 is not enabled, control circuit 20 halts further operation. Control circuit 20 includes NAND gates 110 and 112, flip-flop 114 and halt circuit 116. If the output of gate 98 does not enable gate 100, it will enable gate 112 via gate 110 resulting in flip-flop 114 received a triggering signal at its set input. Flip-flop 114 then provides an output from its Q output which energizes halt circuit 116 which may be utilized to arrest further operation.

Initializing circuit 22 provides for passage of a first document which sets up the conditions for continuous detection operation. The initializing circuit 22 includes switch 118 connected in circuit with voltage source 120, resistor 122, junction 124 and circuit ground indicated by the ground symbol. Circuit 22 further includes a JK flip-flop 126 and NAND gates 128 and 130, which gates have open collector output transistors. The JK flip-flop is coupled to receive a voltage $V_{cc}$ on line 132 and has its $\overline{Q}$ output coupled to the K input. The JK flip-flop operates such that a low voltage signal at the $\overline{Q}$ output is provided when a high voltage signal is received at the clock (c) input and is coupled to provide a high voltage signal at the $\overline{Q}$ output when a low voltage signal is received at the reset (r) input. When switch 118 is momentarily depressed the ground voltage at junction 124 resets JK flip-flop 126. The $\overline{Q}$ output of flip-flop 126 is transmitted to gates 128 and 130 which are connected to responsive circuit 16 via junctions 82 and 90 respectively. As is apparent, the outputs of the initializing circuit 22 are substituted for the outputs of comparison circuit 14 and enables responsive circuit 16. After the JK flip-flop 126 receives a signal at its clock input, the flip-flop 126 is set and the $\overline{Q}$ output is changed. However, by virtue of the open collector configuration of gates 128 and 130, the voltage at junctions 82 and 90 is allowed to float since the transistors included in gates 128 and 130 are not biased to ground.

Figure 2:
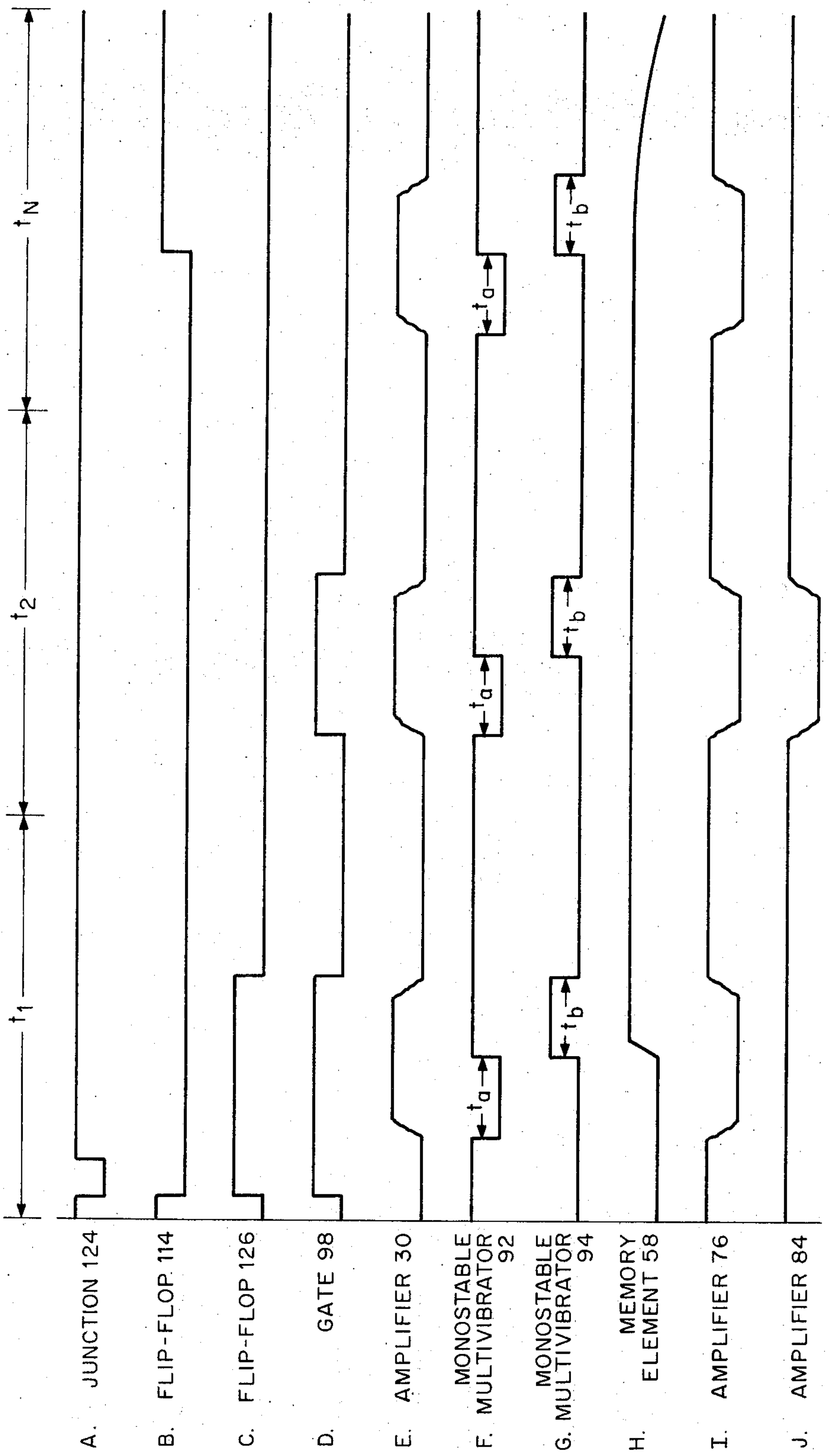
FIG. 2 is a time-based diagram illustrating the operation of various elements shown in FIG. 1.

The complete operation of the dynamic thickness detector will now be explained incorporating the timing diagram of FIG. 2. In FIG. 2, time $T_1$ shows the initializing time period, time $T_2$ shows the thickness acceptable time period and time $T_N$ shows the thickness unacceptable time period.

Initially, the windows of second voltage providing means 12 are set in accordance with the maximum percentage deviation allowed for the document thickness. The switch 118 is then depressed initializing the apparatus. The voltage at junction 124 which was high immediately prior to switch 118 being depressed becomes low as is shown in FIG. 2*a*. This high-to-low voltage signal triggers both flip-flop 114, as shown in FIG. 2*b*, and JK flip-flop 126, as shown in FIG. 2*c*, via their reset inputs. The JK flip-flop provides a high voltage signal via its $\overline{Q}$ output to gates 128 and 130. These signals are inverted and sent to gate 98 via junctions 82 and 90. Since both voltage signals to gate 98 are low, a high voltage signal is transmitted from gate 98 to gate 100 as shown in FIG. 2*d*. It should be noted that any information on memory element 58 is irrelevant since the voltage signals at junctions 82 and 90 are controlled by gates 128 and 130.

A short time after initialization, voltage from the transducer 28 sensing the first document is transmitted to conductor 32 enabling a voltage signal from amplifier 30 shown in FIG. 2*e*. Amplifier 30 provides a low-to-high voltage signal via resistor 48 to the set input of monostable multivibrator 92 resulting in a low voltage signal from the $\overline{Q}$ position as shown in FIG. 2*f*. After a predetermined period T*a*, as shown in FIG. 2*f*, the voltage signal of monostable multivibrator 92 reverts back to its high voltage state. This low-to-high voltage signal provided to the set input of monostable multivibrator 94 enables a high voltage signal via conductor 96 to gate 100. At this time gate 100 has high voltage signals at both inputs. Gate 100 is enabled to provide a low voltage signal to inverting amplifier 102. Amplifier 102 provides a triggering voltage to transistor 104 resulting in transferral of the voltage from amplifier 30 to memory element 58 as shown in FIG. 2*h*.

The high voltage signal from monostable multivibrator 94 is also transmitted via conductor 96 to the clock position C of JK flip-flop 126. After a time period $T_B$ shown in FIG. 2g, the voltage signal of monostable multivibrator 94 changes from high to low. This high-to-low voltage signal triggers JK flip-flop 126 via its clock input resulting in the voltage signal from $\overline{Q}$ going low. The initializing signal is thus removed from gates 128 and 130. The voltage at junctions 82 and 90 is now allowed to float since the open collector configuration of gates 128 and 130 does not ground the junctions. Hence, the voltage at junctions 82 and 90 will be determined by the voltage signal from the comparison means 14.

During time $T_2$ the next document thickness is compared to the previous document thickness. With the presentation of a second document, the voltage signal from amplifier 30 becomes more positive again thereby initiating the blanking operation of time delay circuit 18 via resistor 48 and monostable multivibrator 92. Simultaneously, a voltage is developed by the resistive divider arrangement of resistors 52 and 54 providing one voltage signal to amplifiers 76 and 84. The other voltage signal is provided by memory element 58 through amplifier 60 in circuit with the resistive dividers comprised of resistors 62, 64, 66 and 68. The variable contact of resistor 64 provides a voltage to amplifier 84 equal to the upper limit reference voltage. If the voltage from amplifier 30 is higher than the lower limit established on amplifier 76, a low voltage signal is produced as shown in FIG. 2*i*. Correspondingly, if the voltage from amplifier 30 is lower than the upper limit reference voltage established on amplifier 84, a low voltage signal is produced as shown in FIG. 2*j*. With low voltage signals being provided to junctions 82 and 90, gate 98 provides a high voltage signal to gate 100 as is shown during time $T_2$ for FIG. 2*d*. When the high voltage signal from conductor 96 is received by gate 100, a low voltage signal is provided to inverter amplifier 102 enabling transistor 104 to transfer the current voltage of amplifier 30 to memory element 58, thereby adaptively changing the voltage impressed on element 58 to correspond to the current document thickness. The next document will be compared against the just impressed voltage on element 58. Accordingly, element 58 is refreshed for each acceptable document and long term drift is not a factor.

During time $T_N$, assume that the document being sensed is much thicker than the preceding document. A thicker document produces a higher voltage signal and hence the output voltage of amplifier 30 will be much greater than the voltage presently stored on memory element 58. The voltage output of amplifer 30 is transmitted to amplifiers 76 and 84 via conductor 56. As is shown in FIG. 2*i* during a portion of time $T_N$, amplifier 76 will provide a low voltage signal since the reference voltage from resistor 64 will be lower than the voltage transmitted through conductor 56. As is shown in FIG. 2*i* during time $T_N$, amplifier 84 will provide a high voltage signal since the reference voltage from variable resistor 66 will be lower than the voltage transmitted through conductor 56. A high voltage signal from either amplifier 76 or 84 indicates that the reference voltage criteria has not been met. In this particular example, a voltage greater than the upper reference voltage has been detected and consequently a high voltage signal is provided. Gate 98 now has one high and one low input signal. In this instance, gate 98 provides a low voltage signal to gate 100. Since gate 100 does not receive two high voltage signals, it is not enabled and consequently transistor 104 is not enabled.

Gate 98 provides, however, a low voltage signal to gate 110 which inverts this signal providing a high voltage signal to gate 112. When monostable multivibrator 94 provides a high voltage signal via conductor 96, gate 112 is enabled and provides a low voltage signal to the set position of flip-flop 114. This high-to-low signal triggers flip-flop 114 and provides a high voltage signal to halt circuit 116. Halt circuit 116 may be utilized to sound an alarm and deactivate the thickness detector system. The operator may then remove the thick paper from the system and reinitialize the apparatus.

It is apparent from the foregoing that the invention provides for the detection of an overlapped or too thin document condition even though the documents are of variable thickness. Further, it is apparent that a continuous modification of the window due to the refreshed voltage of memory element 58 is shown. This adaptive memory element in conjunction with the comparison circuit provides a highly reliable and sensitive detector and checking circuitry.

While the invention has been particularly shown and described with reference to the preferred embodiment, it will be understood by those skilled in the art that other changes in form and details may be made without departing from the spirit and scope of the invention. Thus only one window need be used if either a high or low thickness is only desired to be detected. Obvious equivalents to the gates are well known to those skilled in the art. It is intended, therefore, to cover all such changes and modifications in the appended claims.

What is claimed as new and novel and desired to be secured by Letters Patent is:

1. The combination comprising:

a. first means for providing a first voltage;

b. second means for providing a voltage range; said voltage range being a predetermined percentage of a second voltage;

c. means coupled to said first means and said second means for comparing said voltage to said voltage range, said comparing means providing a signal in either a first or second state; and d. means coupled to said comparing means and responsive to the signal provided thereby for repetitively changing said voltage range provided by said second means when said comparing means provides said signal in said first state.

2. The combination as defined in claim 1 and further comprising:

halt means for indicating when said first voltage is unacceptable, and means coupled to said comparing means for initializing said halt means when said comparing means is in said second state.

3. The combination as defined in claim 1 wherein said second voltage is a reference voltage and wherein said second means includes at least one voltage window which has a range of voltage comprising a predetermined percentage of said reference voltage.

4. The combination as defined in claim 3 wherein said window includes a resistive divider; and, said resistive divider providing a voltage corresponding to an extreme voltage.

5. The combination as defined in claim 1 wherein said second means includes a first voltage window and a second voltage window;

said first window providing a voltage equal to an upper voltage reference; and said second window providing a voltage equal to a lower voltage reference.

6. The combination as defined in claim 5 wherein said comparison means includes a first amplifier which contrasts said voltage of said first means to said voltage of said first window;

a second amplifier which contrasts said voltage of said first means to said voltage of said second window;

said first amplifier providing a signal in said first state when said voltage of said first means is less than said voltage of said first window; and said second amplifier providing a signal in said first state when said voltage of said first means is greater than said voltage of said second window.

7. The combination as defined in claim 1 wherein said second means includes a gating element, said signal in said first state from said comparing means enabling said gating element to transfer said first voltage to said second voltage, said voltage range of said second means being changed to a predetermined percentage of said first voltage.

8. The combination as defined in claim 1 and further including initializing means coupled to said comparing means and said means for changing for energizing said means for changing; and said initializing means including a bistable means having a first and second state.

9. The combination as defined in claim 8 and further including time delay means coupled to said first means for providing a predetermined delay period;

said time delay means responsive to said voltage from said first means; and said time delay means providing a signal to said means for changing and to said means for initializing.

10. Document thickness checking apparatus comprising:

reference voltage means for providing a reference voltage, source means for providing a voltage to be monitored, means responsive to said reference voltage for establishing a voltage range having the limits of an acceptable voltage being monitored, means responsive to said source means and said establishing means for comparing said voltage to said voltage range, and means responsive to said comparing means for transferring said voltage of said source means to said reference voltage means when said voltage of said source means is within said voltage range, whereby said voltage becomes the reference voltage and said establishing means effects a new voltage range.

11. Apparatus as defined in claim 10 wherein said reference voltage is proportional to the thickness of a first document received by said apparatus and wherein said source voltage is proportional to the thickness of a second document received by said apparatus after the reception of said first document, whereby the voltage of said first means for providing is refreshed with a voltage corresponding to successively received documents.

12. Apparatus as defined in claim 11 wherein said means for changing is inhibited if said voltage proportional to the thickness of said second document is outside said voltage range.

13. Apparatus as defined in claim 11 wherein said reference voltage means includes a capacitor and wherein said capacitor is changed to said voltage proportional to said second document if said voltage proportional to the thickness of said second document is within said voltage range.

14. Adaptive document thickness checking apparatus comprising:

a. a first voltage means for providing a voltage corresponding to the thickness of an unknown document, b. a second voltage means coupled to said first voltage means for providing a voltage corresponding to the thickness of a previously detected document, c. comparison means coupled to both said first and second voltage means for contrasting said voltage from said first voltage means to said voltage from said second voltage means, said comparison means providing a signal in either a first or second state, d. control means coupled to said comparison means and responsive to said signal in said first state from said comparison means, said control means coupled to change said voltage of said second voltage means to the voltage of said first voltage means, and e. inhibiting means coupled to said comparison means and responsive to said signal in said second state from said comparison means, said inhibiting means arresting the operation of said apparatus.

15. An apparatus as defined in claim 14 and further including time delay means coupled between said first voltage means and said control means for providing a predetermined period between the introduction of said voltage to said first voltage means and said signal from said comparison means, initializing means coupled to said comparison means for providing a signal to said comparison means, said initializing means inhibiting said comparison means.

16. An apparatus as defined in claim 15 wherein said second voltage means includes a memory element storing said voltage of said second voltage means, a first window including a first resistive divider, said first window providing a voltage equal to an upper limit reference voltage, a second window including a second resistive divider, said second window providing a voltage equal to a lower limit reference voltage, and said voltage of said memory element providing the basis for said upper and lower limit reference voltage.

* * * * *